United States Patent
Lin et al.

(10) Patent No.: US 8,081,289 B2
(45) Date of Patent: Dec. 20, 2011

(54) ENHANCED WAVELENGTH-CONVERTING STRUCTURE

(75) Inventors: Yu-Ping Lin, Taoyuan (TW); Chih-Yuan Chen, Yangmei Town, Taoyuan County (TW); Pei-Ju Lai, Chiayi (TW); Ding-He Chen, Chupei (TW)

(73) Assignee: Universal Optoelectronics Co., Ltd., New Taipei (TW)

( * ) Notice: Subject to any disclaimer, the term of this patent is extended or adjusted under 35 U.S.C. 154(b) by 718 days.

(21) Appl. No.: 12/186,725

(22) Filed: Aug. 6, 2008

(65) Prior Publication Data
US 2010/0033947 A1    Feb. 11, 2010

(51) Int. Cl.
*C09K 19/02* (2006.01)
*G02B 6/10* (2006.01)
*F21V 9/16* (2006.01)
*G02F 2/02* (2006.01)

(52) U.S. Cl. ........ 349/176; 349/175; 385/131; 385/141; 362/84; 359/326

(58) Field of Classification Search ............ 385/129, 385/130, 131, 141, 14; 362/84; 359/326; 349/175, 176, 172
See application file for complete search history.

(56) References Cited

U.S. PATENT DOCUMENTS

| | | | |
|---|---|---|---|
| 6,404,125 B1 * | 6/2002 | Garbuzov et al. | 313/499 |
| 7,196,354 B1 * | 3/2007 | Erchak et al. | 257/79 |
| 7,294,965 B2 * | 11/2007 | Kobayashi et al. | 313/506 |
| 2004/0135502 A1 * | 7/2004 | Kobayashi et al. | 313/506 |
| 2008/0176066 A1 * | 7/2008 | Chang et al. | 428/336 |
| 2010/0033947 A1 * | 2/2010 | Lin et al. | 362/84 |

* cited by examiner

*Primary Examiner* — Brian Healy
(74) *Attorney, Agent, or Firm* — Thomas, Kayden, Horstemeyer & Risley, LLP

(57) ABSTRACT

An enhanced wavelength-converting structure is disclosed. The enhanced wavelength-converting structure includes a substrate, a wavelength-converting layer arranged next to the substrate, and a wavelength-selective reflecting layer arranged next to the wavelength-converting layer. The wavelength-converting layer converts the first light into the second light. A part of the second light radiating backward to the light source is further reflected toward the substrate by the wavelength-selective reflecting layer to form the enhanced second light by combining with another part of the second light radiating toward the substrate.

12 Claims, 3 Drawing Sheets

ENHANCED WAVELENGTH-CONVERTING STRUCTURE

BACKGROUND

1. Field of Invention

The present invention relates to a multi-layer structure. More particularly, the present invention relates to an enhanced wavelength-converting structure.

2. Description of Related Art

A wavelength-converting structure has been used for converting a first light into a second light. The wavelength-converting structure may include a substrate and a wavelength-converting material. An adhesive can combine the substrate and the wavelength-converting material. The wavelength-inverting structure can be utilized in a light-emitting diode (LED), such as a phosphor based LED. The wavelength-converting structure can merely convert the first light in to the second light. However, a part of the second light would emit to the substrate, but another part of the second light would emit backward to the light source. The part of the second light emitting backward to the light source would be utilized efficiently and be wasted. For the forgoing reasons, the present invention provides an enhanced wavelength converting structure with a wavelength-selective reflecting layer to improve light emitting efficiency.

SUMMARY

The invention provides an enhanced wavelength-converting structure. The enhanced wavelength-converting structure includes a substrate, a wavelength-converting layer arranged next to the substrate, and a wavelength-selective reflecting layer arranged next to the wavelength-converting layer. The wavelength-converting layer converts the first light into the second light. A part of the second light radiating backward to the light source is further reflected toward the substrate by the wavelength-selective reflecting layer to form the enhanced second light by combining with another part of the second light radiating toward the substrate.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
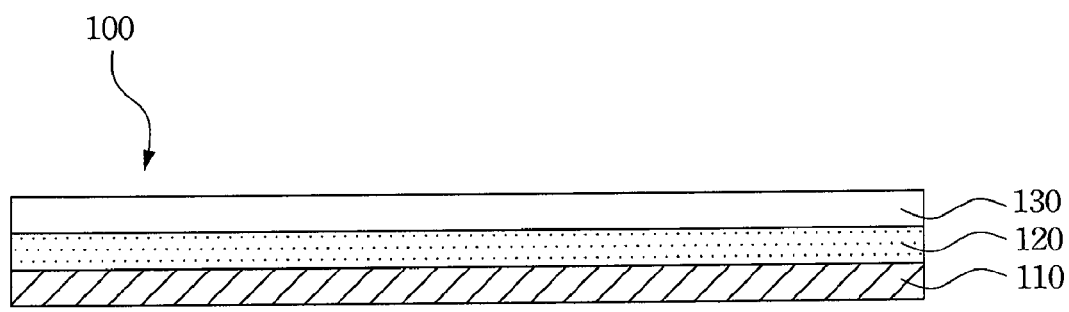
FIG. 1 illustrates a schematic diagram of an embodiment of the enhanced wavelength-converting structure of the invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. FIG. 1 illustrates a schematic diagram of an embodiment of the enhanced wavelength-converting structure of the invention. The enhanced wavelength-converting structure 100 may be a shared flat multi-layer structure. The enhanced wavelength-converting structure 100 includes a wavelength-selective reflecting layer 110, a wavelength-converting layer 120, and a substrate 130. The wavelength-converting layer 120 is arranged next to the substrate 130. The wavelength-selective reflecting layer 110 is arranged next to the wavelength-converting layer 120. The wavelength-selective reflecting layer 110, the wavelength-converting layer, and the substrate 130 are arranged in order.

The enhanced wavelength-converting structure 100 can be disposed on a light source. The light source illuminates a first light toward the enhanced wavelength-converting structure 100. The wavelength-converting layer 120 could excite a part of the first light and convert the same part of the first light into a second light. The wavelength of the second light is different from the wavelength of the first light. The selective wavelength of the wavelength-selective reflecting layer 110 is according to the wavelength of the second light.

However, the second light excited by the wavelength-converting layer 120 is not directional. A part of the second light may radiate backward to the light source, and another part of the second light may radiate toward the substrate 130. The part of the second light radiating backward to the light source may be reflected toward the substrate 130 with the wavelength-selective reflecting layer 110 to form the enhanced second light by combining with another part of the second light, which is radiating toward the substrate 130. Thus the enhanced second light and the first light may radiate toward the substrate 130 identically to improve the light emitting efficiency.

Figure 2:
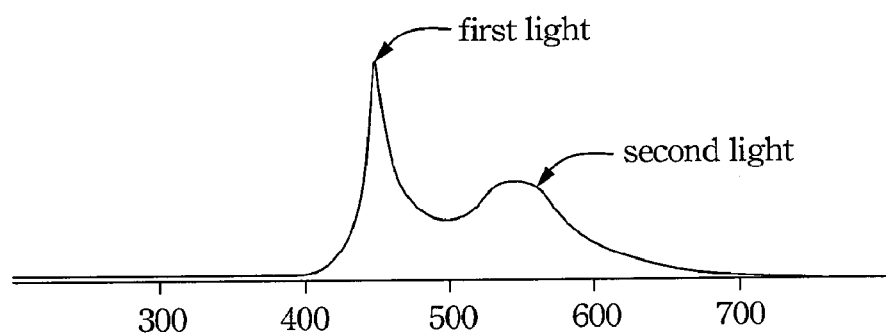
FIG. 2 illustrates a wavelength diagram of an embodiment of the enhanced wavelength-converting structure of the invention.

The selective wavelength of the wavelength-selective reflecting layer 110 is according to the wavelength of the second light. As shown in FIG. 2, the first light in this embodiment has the wavelength between 400 nm to 500 nm. The second light is converted by the YAG phosphor, and the wavelength of the second light is 550~650 nm. The wavelength-selective reflecting layer 110 would only reflect the light with the wavelength of 550~650 nm, which is same as the wavelength of the second light. The wavelength-selective reflecting layer 110 cannot reflect other lights with the wavelength longer or shorter than the specific range.

The wavelength-converting layer 120 may be formed on the substrate 130, and the wavelength-selective reflecting layer 110 may be formed on the wavelength-converting layer 120. The wavelength-converting layer 120 may be coated on the substrate 130 with a roll-to-roll process, a dip coating process, a comma coating process, a spraying coating process, a spin coating process, a slot coating process, a curtain coating process, or a gravure coating process.

The wavelength-converting material of the wavelength-converting layer 120 may include phosphor powder, photo luminescent layer, fluorescent color-conversion-media, organic complex material, luminescent pigments, quantum dots-based material, quantum wire-based material, quantum well-based material, or the combination thereof. The substrate 130 is a transparent film. The material of the substrate 130 may be PC (Polycarbonate), PMMA (polymethyl methacrylate), MS (methyl styrene), PET (polyethylene terephthalate), quartz, or glass.

For example, the method for fabricating the wavelength-selective reflecting layer starts at preparing a leveling agent solution. The leveling agent solution may be a BYK 361N solution, and the concentration of the leveling agent solution is one percent by weight. The step of preparing the leveling agent solution includes adding 1 g of BYK361N (BYK361N, BYK Corp.) solute into 99 g of cyclopentanone solvent in a first sampling bottle, and then stirring the leveling agent solution until it is completely dissolved.

Then, weight a solute consisted of 10 g of cholesteric liquid crystal (LC 242, BASF), 0.48 g chiral dopant (LC 756, BASF), and add the solute into 28.68 g of cyclopentanone solvent in a second sampling bottle, and then stir the solution in the second sampling bottle until it is completely dissolved. Add 0.52 g of the prepared leveling agent solution, and 0.52 g of photopolymerization initiator (Irgacure-907, Ciba-Geigy) into the second sampling bottle. Stir the solution in the second sampling bottle until it is completely dissolved to get a wavelength-selective reflecting solution.

Then, spread the wavelength-selective reflecting solution on a polyester film, and natural dry the polyester film spread with the wavelength-selective reflecting solution layer under room temperature about 5 minutes. Then, bake the polyester film with the dried wavelength-selective reflecting layer in the baking oven under 85☐ for 5 minutes, and put the polyester film with the baked wavelength-selective reflecting layer under a ultraviolet light (wavelength 365 nm) for 20 minutes to harden the wavelength-selective reflecting layer. Then, the wavelength-selective reflecting layer can be separated from the polyester film.

In this embodiment, the enhanced wavelength-converting structure 100 may be utilized in a white light emitting diode. The light source of the LED chipset may illuminate a blue light as the first light, and a part of the blue light may transmit through the wavelength-converting layer 120, and another part of the blue light may be excited and converted into a yellow light with the wavelength-converting material of the wavelength-converting layer 120. The part of the yellow light radiating backward to the light source may be reflected toward the substrate 130 with the wavelength-selective reflecting layer 110.

Thus the yellow light of the second light could radiate toward the substrate 130 identically. The blue light of the first light and the enhanced yellow light of the second light illuminating toward the substrate 130 could mix to form a white light. The white light of this embodiment may have better intensity with the enhanced yellow light. Furthermore, the wavelength-converting layer 120 may diffuse the first light and the second light at the enhanced wavelength-converting structure 100 for better uniform illumination.

Figure 3A:
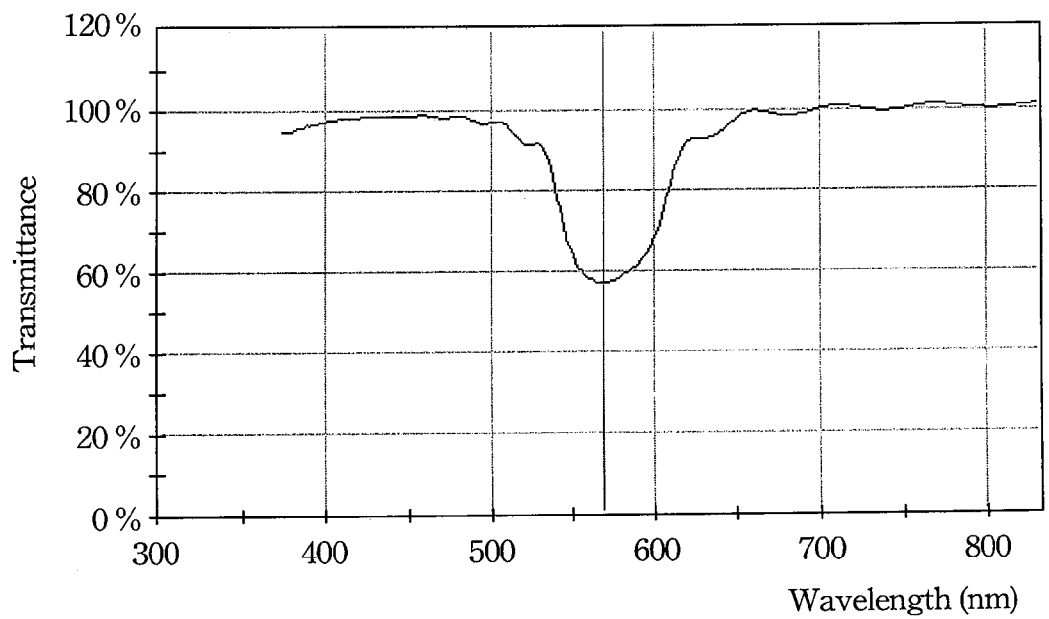
FIG. 3A illustrates a transmittance-wavelength diagram of the wavelength-selective reflecting layer of the invention.
Figure 3B:
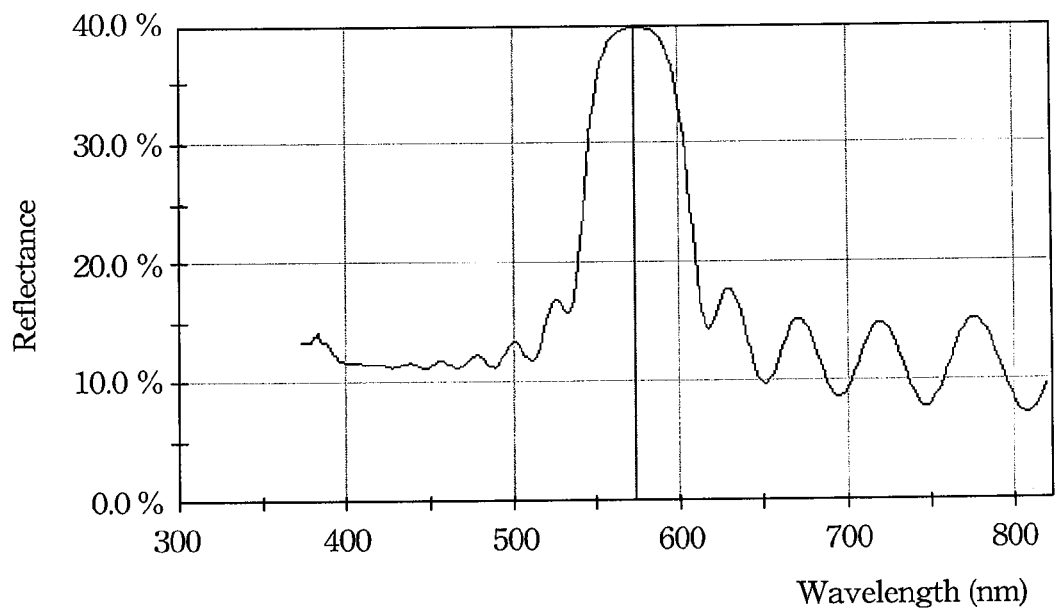
FIG. 3B illustrates a reflectance-wavelength diagram of the wavelength-selective reflecting layer of the invention.

Refer to FIG. 3A and FIG. 3B simultaneously. FIG. 3A illustrates a transmittance-wavelength diagram of the wavelength-selective reflecting layer of the invention. FIG. 3B illustrates a reflectance-wavelength diagram of the wavelength-selective reflecting layer of the invention. The wavelength of the first light in this embodiment is 400~500 nm, and the wavelength of the second light converted by the wavelength-converting layer in this embodiment is 550~650 nm.

The transmittance of wavelength with 400~500 nm at the wavelength-selective reflecting layer is 95~100%, but the transmittance of the wavelength with 550~650 nm at the wavelength-selective reflecting layer is 55~65%. However, the reflectance of the wavelength with 550~650 nm is 30~40%. Namely, the first light can transmit the wavelength-selective reflecting layer, and the second light converted by the wavelength-converting layer backward to the wavelength-selective reflecting layer can be reflected toward the substrate, therefore the overall intensity of the second light toward the substrate may be enhanced.

Figure 4:
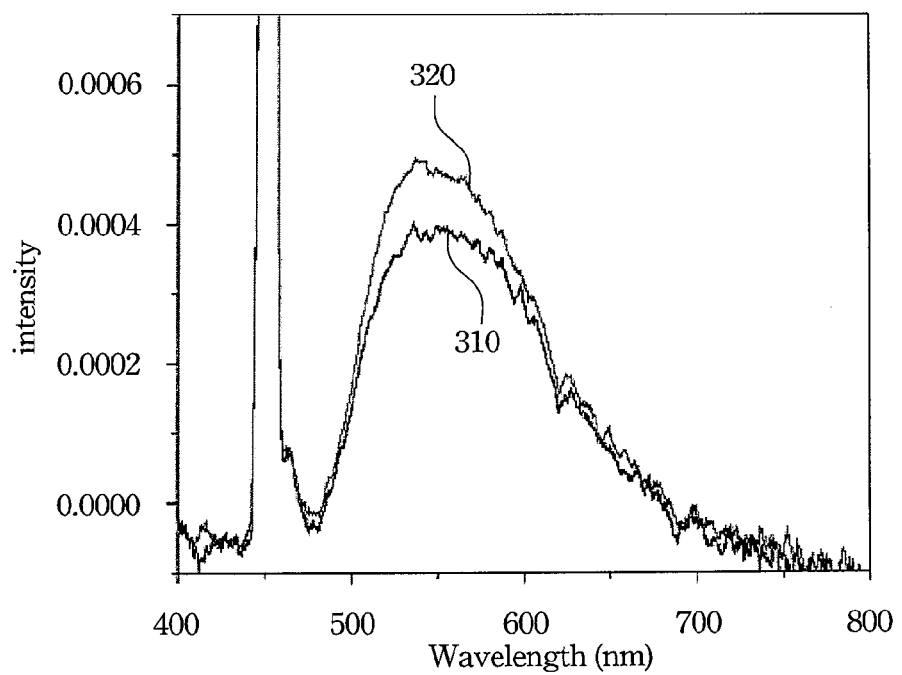
FIG. 4 illustrates a wavelength-intensity diagram of the white LED module with the conventional phosphor and the white LED module with the enhanced wavelength-converting structure of the embodiment of the invention.

The material of the wavelength-selective reflecting layer in this embodiment includes the cholesteric liquid crystal and the chiral dopant, wherein the weight of the chiral dopant is 4.4~5% of the weight of the cholestric liquid crystal. Refer to FIG. 4. FIG. 4 illustrates a wavelength-intensity diagram of the white LED module with the conventional phosphor and the white LED module with the enhanced wavelength-converting structure of the embodiment of the invention. The broken line 310 is according to the yellow light of the conventional white LED, and the broken line 320 is according to the yellow light of the white LED with the enhanced wavelength-converting structure of the invention. The wavelength of the yellow light is about 530 nm to 600 nm. The intensity of the yellow light of the white LED with the enhanced wavelength-converting structure of the present invention is larger than the intensity of the yellow light of the convention white LED, which is without the enhanced wavelength-converting structure. The light emitting efficiency of the mixed white light of white LED with the wavelength-selective reflecting layer disclosed in this embodiment can be improved by enlarging the yellow light emitting intensity.

Figure 5:
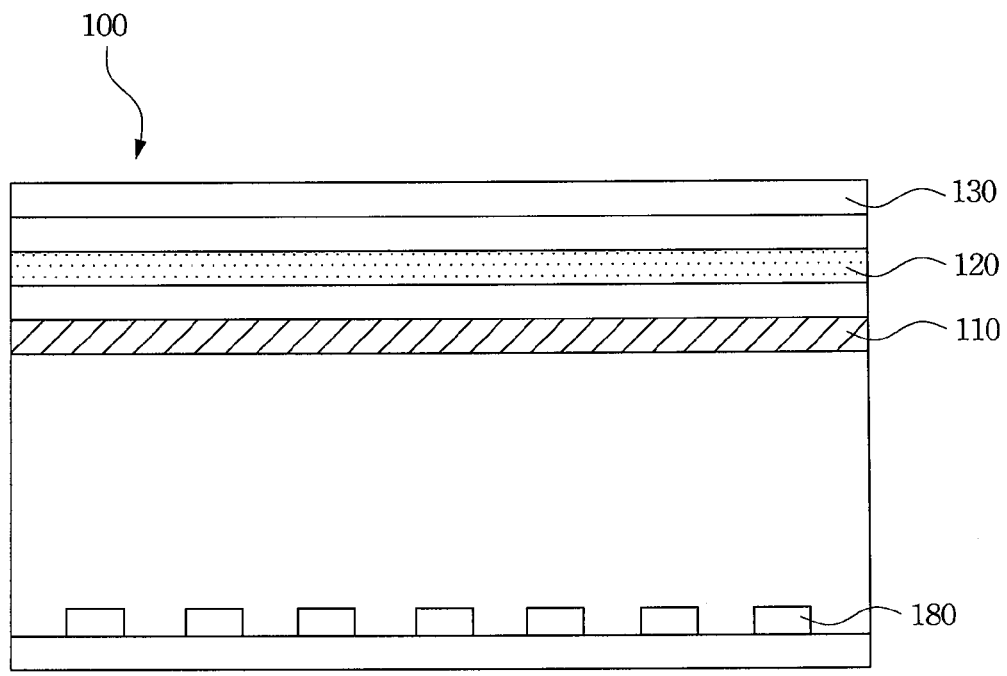
FIG. 5 illustrates a schematic diagram of another embodiment of the enhanced wavelength-converting structure of the invention.

Refer to FIG. 5. FIG. 5 illustrates a schematic diagram of another embodiment of the enhanced wavelength-converting structure of the invention. The wavelength-selective reflecting layer 110, the wavelength-converting layer 120, and the substrate 130 are arranged individually. The wavelength-selective reflecting layer 110 is arranged next to a light source 180. The wavelength-converting layer 120 is arranged next to the wavelength-selective reflecting layer 110. The substrate 130 is arranged next to the wavelength-converting layer 120. The wavelength-selective reflecting layer 110, the wavelength-converting layer 120, and the substrate 130 are arranged in order.

In another embodiment, the wavelength-converting layer 120 may be formed on the substrate 130, and the wavelength-selective reflecting layer may be arranged individually. The light source 180 can be a light emitting diodes chip, a cold cathode fluorescent lamp, or an ultraviolet lamp.

The wavelength-converting layer converts the first light from the light source into the second light. A part of the second light radiating backward to the light source is further reflected toward the substrate by the wavelength-selective reflecting layer to form the enhanced second light by combining with another part of the second light radiating toward the substrate. The intensity of the second light radiating toward the substrate is improved and the intensity of the light mixed with the first light and the second light is enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An enhanced wavelength-converting structure comprising:

a substrate;

a wavelength-converting layer arranged next to the substrate; and a wavelength-selective reflecting layer arranged next to the wavelength-converting layer, wherein the wavelength-converting layer converts a first light into a second light, and the wavelength-selective reflecting layer reflects the second light toward the substrate, wherein a wavelength of the first light is 400~500 nm; a wavelength of the second light is 550~650 nm; a material of the wavelength-selective reflecting layer comprises a cholesteric liquid crystal and a chiral dopant.

2. The enhanced wavelength-converting structure of claim 1, wherein the material of the wavelength-converting layer comprises phosphor powder, photo luminescent layer, fluorescent color-conversion-media, organic complex material, luminescent pigments, quantum dots-based material, quantum wire-based material, quantum well-based material, or the combination thereof.

3. The enhanced wavelength-converting structure of claim 1, wherein the material of the substrate comprises PC (Polycarbonate), PMMA (polymethyl methacrylate), MS (methyl styrene), PET (polyethylene terephthalate), quartz, or glass.

4. The enhanced wavelength-converting structure of claim 1, wherein the wavelength-converting layer is formed on the substrate.

5. The enhanced wavelength-converting structure of claim 1, wherein the wavelength-selective reflecting layer is formed on the wavelength-converting layer.

6. The enhanced wavelength-converting structure of claim 1, wherein the enhanced wavelength-converting structure is disposed on a light source, and the first light from the light source is converted into the second light by the wavelength-converting layer, and a part of the second light radiating toward the light source is further reflected toward the substrate by the wavelength-selective reflecting layer to form the enhanced second light by combining with another part of the second light radiating toward the substrate.

7. The enhanced wavelength-converting structure of claim 6, wherein the light source comprises a light emitting diodes chip, a cold cathode fluorescent lamp, and an ultraviolet lamp.

8. The enhanced wavelength-converting structure of claim 1, wherein the weight of the chiral dopant is 4.4~5% of the weight of the cholestric liquid crystal.

9. The enhanced wavelength-converting structure of claim 1, wherein the first light is a visible light.

10. The enhanced wavelength-converting structure of claim 1, wherein the first light is an invisible light.

11. The enhanced wavelength-converting structure of claim 10, wherein the first light is an ultraviolet light.

12. The enhanced wavelength-converting structure of claim 1, wherein the material of the wavelength-converting layer comprises a phosphor, and an adhesive.

\* \* \* \* \*